United States Patent [19]
Hattori

[11] Patent Number: 5,748,352
[45] Date of Patent: May 5, 1998

[54] OPTICAL SCANNING DEVICE

[75] Inventor: Yutaka Hattori, Kuwana, Japan

[73] Assignee: Brother Kogyo Kabushiki Kaisha, Nagoya, Japan

[21] Appl. No.: 651,574

[22] Filed: May 22, 1996

Related U.S. Application Data

[63] Continuation of Ser. No. 358,095, Dec. 16, 1994, abandoned.

[30] Foreign Application Priority Data

Dec. 17, 1993 [JP] Japan .................. 5-317741

[51] Int. Cl.$^6$ .................................. G02B 26/08
[52] U.S. Cl. ............... 359/196; 359/197; 359/214; 359/216; 347/135
[58] Field of Search ................. 359/196, 197, 359/204, 205, 213–221, 223, 225, 226, 232, 558, 559, 562, 618; 347/131, 132, 135, 253, 255

[56] References Cited

U.S. PATENT DOCUMENTS

| | | | |
|---|---|---|---|
| 4,383,262 | 5/1983 | Noguchi | 347/255 |
| 4,679,057 | 7/1987 | Hamada | 347/253 |
| 4,852,973 | 8/1989 | Durnin et al. | 359/559 |
| 5,121,378 | 6/1992 | Hirose et al. | 369/112 |
| 5,161,047 | 11/1992 | Tomita et al. | 359/216 |

FOREIGN PATENT DOCUMENTS

A-6-43372  2/1994  Japan .

OTHER PUBLICATIONS

"Optics", Eugene Hecht, Adelphi University, Addison–Wesley Publishing Co., 1987, 1974, pp. 406–409.

*Primary Examiner*—Thong Nguyen
*Assistant Examiner*—Darren E. Schuberg
*Attorney, Agent, or Firm*—Oliff & Berridge, P.L.C.

[57] ABSTRACT

Light beam from a light source is changed by a diaphragm so that the center of the light beam is removed. The changed light beam is deflectedly scanned by a deflection device and passed through a condenser lens so as to expose the surface of a photosensitive object. A small spot of light beam of stable intensity is therefore obtained to be irradiated on the photosensitive object. Thus, the optical scanning device has a simple structure and attains high resolution.

12 Claims, 6 Drawing Sheets

OPTICAL SCANNING DEVICE

This is a Continuation of application Ser. No. 08/358,095 filed Dec. 16, 1994, now abandoned.

BACKGROUND OF THE INVENTION

1. Field of the Invention

The present invention relates to an optical scanning device which scans a photosensitive drum with high-quality light beams from a light source such as a laser beam to form images by electrophotographic processes.

2. Description of the Related Art

Conventionally, there has been known a laser beam printer wherein images are printed according to latent electrostatic images formed on a photosensitive surface of a photoconductive material by irradiating the photosensitive material with a laser light.

FIG. 1 shows the configuration of an optical scanning device used in a conventional laser beam printer. A semiconductor laser 1 is provided for emitting a light beam with directivity as modulated by a modulating unit (not shown) according to an image signal. A collimator lens 2 is provided in confrontation with the semiconductor laser 1 so that the light beam emitted from the semiconductor laser 1 falls incident on the collimator lens 2. The collimator lens 2 is for converting the incident beam of light into a parallel light beam.

A diaphragm 6 for stopping down light from the collimator lens 2 to a desired size is positioned in confrontation with the collimator lens 2. The diaphragm 6 is formed with a rectangular shaped aperture 100 for receiving the parallel ray from the collimator lens 2 and producing a parallel light beam having a rectangular cross section. The aperture 100 is made from a through-hole formed in the diaphragm 6. The center of the aperture of the diaphragm 6 is located aligned with the optical axis of the collimator lens 2. The longest dimension of the aperture is aligned in the main scanning direction of the printer.

A polygon mirror 3, which acts as a deflection device, is positioned in the path of the rectangular light beam from the diaphragm 6. The polygon mirror 3 has a plurality of reflective surfaces and is provided rotatable about its axis 3a at a set angular speed. The polygon mirror 3 is located with the axis 3a extending in an auxiliary scanning direction y so that its reflective surfaces rotating about the axis 3a may scanningly deflect the light beam in a main scanning direction x perpendicular to the auxiliary scanning direction y.

A condenser lens 4 and a photosensitive drum 5 are positioned in the path of light deflected off the polygon mirror 3. The condenser lens 4 is for gathering light deflected off the polygon mirror 3 and directing the light toward the photosensitive drum 5 so that the light is incident on the photosensitive drum 5 as a small spot. The condenser lens 4 also has an fθ characteristic for converting the light beam that is scanningly deflected at a set angular velocity into a linear scan of a set linear speed on the photosensitive drum 5. The photosensitive drum 5 is made from a photosensitive material and is provided rotatable about its axis 5a at a set speed. The photosensitive drum 5 is located with the axis 5a extending in the main scanning direction x.

In the optical scanning device with components configured as described above, the modulated light beam emitted from the semiconductor laser 1 passes through the collimator lens 2, where the light beam is converted into a parallel ray. The parallel light ray produced at the collimator lens 2 passes through the diaphragm 6. The diaphragm 6 stops down the parallel light ray to a desired size, reduced to the rectangular shape of the aperture 100, and guides it so as to be incident on the polygon mirror 3. The rectangular light beam from the diaphragm 6 is deflected at a set angular velocity off surfaces of the rotating polygon mirror 3 so as to be raster scanned in the main scanning direction x across the rotating photosensitive drum 5 after passing through the condenser lens 4. In this way a two-dimensional latent electrostatic image is formed on the surface of the photosensitive drum 5 according to an image signal.

SUMMARY OF THE INVENTION

The present inventor has investigated the above-described conventional optical scanning device.

FIG. 2 shows construction of the diaphragm 6 used for the above-described optical scanning device. In this figure, the direction of axis ξ is parallel to the main scanning direction x in which the light beam is scanned by rotation of the polygon mirror 3, and the direction of axis η extends parallel to the auxiliary scanning direction y perpendicular to the main scanning direction x. The aperture 100 is indicated by hashed lines. The center of the aperture 100 is designated by an intersection between the axes ξ and η. The aperture 100 is a rectangular opening in the diaphragm 6 and has a length $2a$ along axis ξ and a length $2b$ along axis η. The light beam passes through the diaphragm 6 and is focused into a spot on the photosensitive drum 5 by the condenser lens 4. The distribution of intensity of the spot along the main scanning direction x parallel to the axis ξ can be determined by the following formulas (1) and (2):

$$I(x) = I_0 \left( \frac{\sin(Ax)}{Ax} \right)^2 \qquad (1)$$

$$A = \frac{2\pi a}{\lambda f_2} \qquad (2)$$

wherein x is the coordinate in the main scanning direction on the photosensitive drum 5;

$I_0$ is the spot center intensity, that is, the intensity at the center of the spot;

λ is the wavelength of the semiconductor laser 1; and $f_2$ is the focal length of the condenser lens 4.

The light beam emitted from the semiconductor laser 1 is spread. Accordingly, when the amount (intensity) of light thus emitted originally from the semiconductor laser 1 is represented by P, the amount (intensity) E of light that finally reaches the photosensitive drum 5 is determined by the following formula (3):

$$E = \gamma P \qquad (3)$$

where γ is a rate of efficiency which is determined dependently on the optical system employed in the device. More specifically, the rate of efficiency γ depends on the size $2a$ of the aperture 100 and the focal length $f_1$ of the collimator lens 2 in a relationship depicted by the following formula (4):

$$\gamma \propto a/f_1 \qquad (4)$$

To reduce the diameter of the spot irradiated on the photosensitive drum 5, and thereby increase the resolution, and therefore the quality, of the printed image, the wavelength of light produced by the semiconductor laser can be shortened, a condenser lens with a shorter focal length can be used to increase the apparent numerical aperture (NA), or the same focal length can be used but the aperture size can be increased to obtain the same results.

However, a semiconductor laser that emits light with a shorter wavelength than conventional semiconductor lasers for generating 780 nm wavelength light would have a shorter life, be less reliable, more expensive to produce, and therefore would not be practical. When the focal length of a condenser lens is shortened, the configuration of the device must be redesigned, which is costly. The condenser lens itself must also be designed to maintain the condensing characteristic and the desired scanning width. Therefore, a non-spherical surface or a toric surface that is nonsymetrical in regards to the axis must be used, thereby increasing costs. When the aperture of the diaphragm is enlarged, the effective radius of the condensing lens must also be enlarged. Therefore, precision must be increased so that redesigning becomes necessary, thereby increasing costs.

Further, the semiconductor laser is modulated to produce illumination and non-illumination intensities for producing illumination and non-illumination states respectively on the photosensitive drum 5. The illumination and non-illumination states translate respectively to black regions (i.e., with dots) and white regions (i.e., with no dots) in the printed image through a regular development process. Intensities that are required for producing illumination and non-illumination states vary depending on the sensitivity of the photosensitive drum. Here it is assumed that intensity $E_{21}$ is the intensity for producing an illumination state (which translates to a printed dot) on the photosensitive drum 5 during regular developing and intensity $E_{22}$ is the intensity for producing a non-illumination state (i.e., no dot). The ratio between the intensities $E_{21}$, and $E_{22}$ will be referred to as the intensity modulation rate hereinafter.

Since the intensity E equals the product of the rate of efficiency $\gamma$ and the intensity P (i.e., $E=\gamma P$) as described above, the semiconductor laser 1 must be capable of modulatingly emitting light between intensity $P_{21}$. and intensity $P_{22}$, where the values $P_{21}$ and $P_{22}$ satisfy the following formulas (5) and (6):

$$E_{21}=\gamma P_{21} \qquad (5)$$

$$E_{22}=\gamma P_{22} \qquad (6)$$

It is assumed here that application of drive currents $i_{21}$ and $i_{22}$ to the semiconductor laser 1 causes the semiconductor laser 1 to emit light of intensities $P_{21}$ and $P_{22}$ respectively. The difference between the currents $i_{21}$ and $i_{22}$ will be referred to as a current modulation width hereinafter.

Because conventionally the rate of efficiency $\gamma$ is determined by the desired spot diameter and the configuration of the device, only optical scanning devices provided with expensive circuitry including modulation circuitry attaining a large current modulation width can modulate to produce a large intensity modulation rate.

FIG. 3 shows the relationship between the drive current i of the laser and the intensity E of light irradiated on the photosensitive drum 5. The characteristic indicated by $\beta=0$ is for a conventional optical scanning device. The characteristic indicated by $\beta=\beta 1$ is for an optical scanning device according to the present invention (to be described later). In the conventional optical scanning device, the intensity of the semiconductor laser increases proportionally at a mild rate until the drive current exceeds a threshold value, whereupon the intensity increases rapidly. The drive current of the semiconductor laser must be modulated between $i_{22}$ and $i_{21}$ to produce exposure intensities $E_{22}$ and $E_{21}$ on the photosensitive drum 5. However, when intensity $E_{21}$ is somewhat low and the drive current $i_{21}$ is near the threshold value, the drive current must be modulated almost within a gently slanting region located lower than the threshold value. This requires current to be modulated within a large current modulation width to produce light intensities at extremes of the desired intensity modulation rate. A costly circuit configuration must be provided to produce a large current modulation width.

FIG. 4 shows correspondence over time t (horizontal axis) between the drive current i (vertical axis at lower half of graph) applied to the semiconductor laser that is modulated between $i_{22}$ and $i_{21}$ according to a modulation signal and intensity P (vertical axis at upper half of graph) of light emitted from the semiconductor laser. In a conventional optical scanner device, as depicted by solid lines, when the drive current is modulated from $i_{22}$ to $i_{21}$, the intensity P rises from intensity $P_{22}$ to intensity Pa before lowering to intensity $P_{21}$. This phenomenon is caused by thermal relaxation. The difference between intensity Pa and intensity $P_{21}$ is termed the droop characteristic of the semiconductor laser.

When the semiconductor laser is applied with the drive current modulated with a large current modulation width, the oscillation condition of the semiconductor laser becomes unstable, which leads to a poor thermal relaxation characteristic, that is, to an inferior droop characteristic and therefore poor image quality.

The droop characteristic also becomes undesirably large the closer drive current $i_{21}$ (intensity $P_{21}$) is to the threshold value. Accordingly, to accurately obtain a desired intensity, it is best to illuminate the semiconductor laser at the maximum intensity its rating permits. However, conventionally it has not been possible to select the modulation range of the semiconductor laser so that it is modulated in a favorable region of its droop characteristic, because the intensity $P_{21}$ has to be set depending on the rate of efficiency $\gamma$ of the device, It is therefore an object of the present invention to overcome the above-described drawbacks, and to provide an optical scanning device capable of producing images with superior resolution, and therefore higher image quality, than that of conventional devices.

In order to attain the above object and other objects, the present invention provides an optical scanning device for scanning light beams onto a photosensitive body, the device comprising: a light source for emitting light beams; a deflection device for deflecting the light beams emitted from the light source in a scan; a photosensitive body positioned so that the light beams deflected by the deflection device becomes incident on a surface of the photosensitive body to form an image on the surface of the photosensitive body; a condensing means for gathering light from the light source and directing the light toward the surface of the photosensitive body; and a diaphragm positioned between the light source and the deflection device, a center portion of the diaphragm being formed with an aperture, the diaphragm including a cover portion for blocking a center portion of light emitted from the light source from passing through the aperture.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
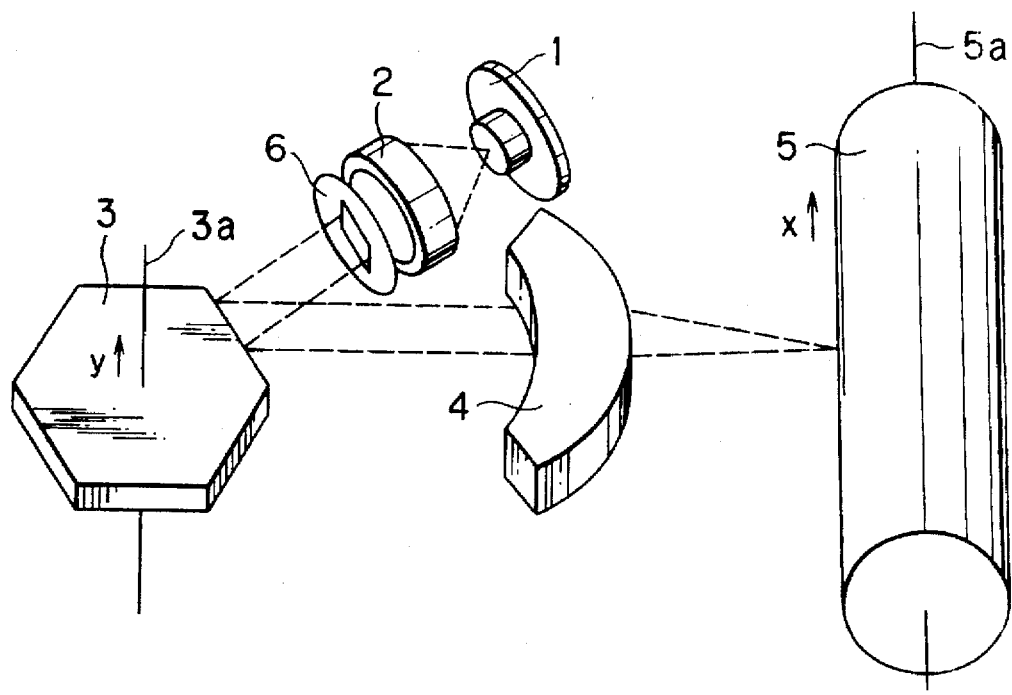
FIG. 1 is a perspective view schematically showing a conventional optical scanning device.
Figure 2:
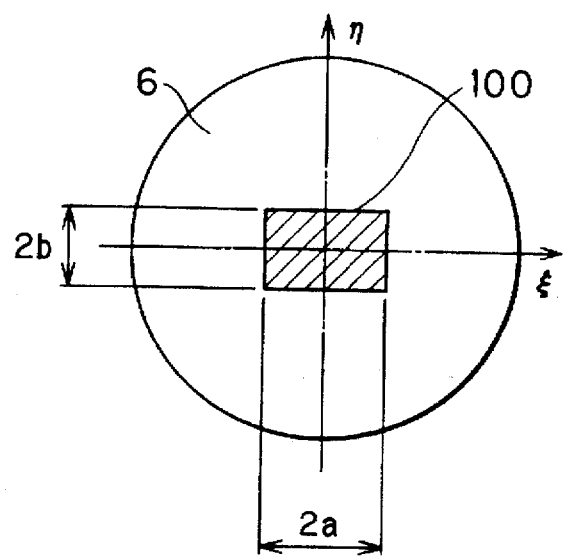
FIG. 2 is a planer view showing details of a diaphragm of the optical scanning device shown in FIG. 1.

An optical scanning device according to preferred embodiments of the present invention will be described while referring to the accompanying drawings wherein like parts and components are designated by the same reference numerals to avoid duplicating description.

Figure 5:
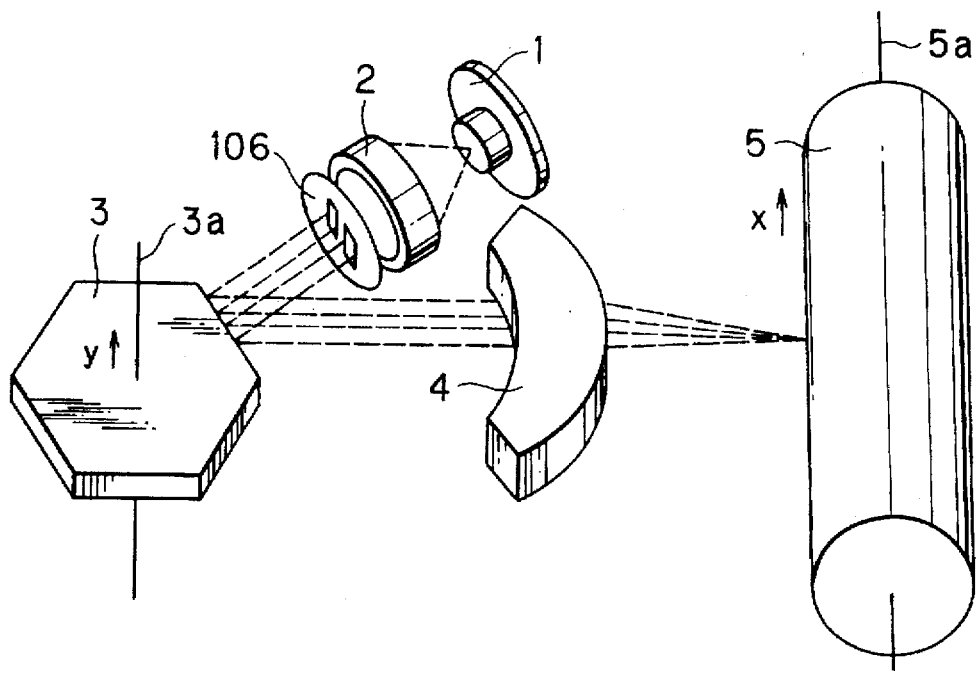
FIG. 5 is a perspective view schematically showing an optical scanning device according to a preferred embodiment of the present invention.

FIG. 5 shows configuration of components of an optical scanning device according to a first preferred embodiment of the present invention. A semiconductor laser 1 is provided for emitting a light beam with directivity as modulated by a modulating unit (not shown) according to an image signal. A collimator lens 2 is provided in confrontation with the semiconductor laser 1 so that light beam emitted from the semiconductor laser 1 falls incident on the collimator lens 2. The collimator lens 2 is for converting the incident beam of light into a parallel ray of beam.

Figure 6:
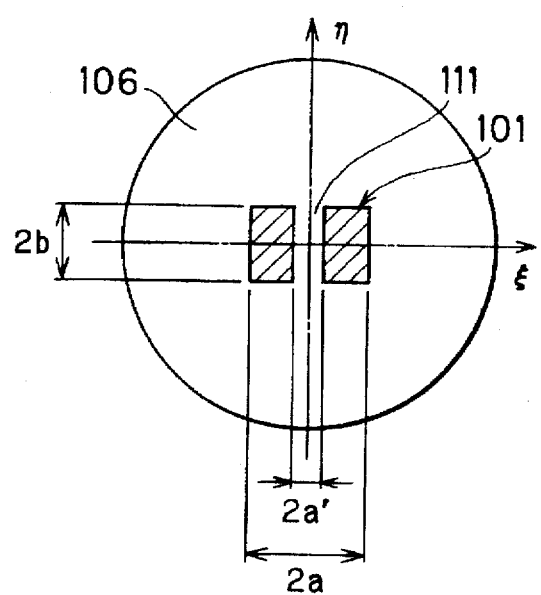
FIG. 6 is a planer view showing details of a diaphragm of the optical scanning device shown in FIG. 5.

A diaphragm 106 for stopping down light from the collimator lens 2 to a desired size is positioned in confrontation with the collimator lens 2. FIG. 6 shows the shape of the diaphragm 106 according to the first preferred embodiment. The diaphragm 106 includes a rectangular aperture 101. In this embodiment, the aperture is made from a through-hole formed in the diaphragm. A cover portion 111 is provided for covering the center of the aperture 101. In this figure, the direction of axis $\xi$ is parallel to the main scanning direction x and the direction of axis $\eta$ extends parallel to the auxiliary scanning direction y perpendicular to the main scanning direction x. The aperture 101 is indicated by hashed lines. The center of the aperture 101 is designated by an intersection between the axes $\xi$ and $\eta$, and is covered with the cover portion 111. In this embodiment, the length of the aperture along the axis $\xi$ is $2a$ and the length of the aperture along the axis $\eta$ is $2b$. The cover portion 111 has a width along the axis $\xi$ of $2a'$. The aperture 101 thus provided with the cover portion 111 is for receiving the parallel light beam produced in the collimator lens 2 and producing a light beam with the center portion removed when the parallel light beam passes through the diaphragm 106.

A polygon mirror 3, which acts as a deflection device, is positioned in the path of the light beam from the diaphragm 106. The polygon mirror 3 has a plurality of reflective surfaces and is provided rotatable about its axis $3a$ at a set angular speed. The polygon mirror 3 is located with the axis $3a$ extending in the auxiliary scanning direction y so that its reflective surfaces rotating about the axis $3a$ may scanningly deflect the light beam in the main scanning direction x.

A condenser lens 4 and a photosensitive drum 5 are positioned in the path of light deflected off the polygon mirror 3. The condenser lens 4 is for gathering light deflected off the polygon mirror 3 and directing the light so it is incident on the photosensitive drum 5 as a small spot The condenser lens 4 has also an f$\theta$ characteristic for converting the light beam that is scanningly deflected at a set angular velocity into a linear scan of a set linear speed on the photosensitive drum 5. The photosensitive drum 5 is made from a photosensitive material and is rotatable about its axis $5a$ at a set speed. The photosensitive drum 5 is located with the axis $5a$ extending in the main scanning direction x.

With this configuration the modulated light beam emitted from the semiconductor laser 1 passes through the collimator lens 2 where it is converted into a parallel light ray. Parallel light produced when the light beam passes through the collimator lens 2 passes through the diaphragm 106 where it is stopped down to a desired size and guided so as to be incident on the polygon mirror 3. The light beam from the diaphragm 6 is deflected at a set angular velocity off surfaces of the rotating polygon mirror 3 so as to be raster scanned across the rotating photosensitive drum 5 after passing through the condenser lens 4. In this way a two-dimensional latent electrostatic image is formed on the surface of the photosensitive drum 5 according to an image signal.

The light beam that passes through diaphragm 106 is focused by the condensing lens 4 into a spot on the surface of the photosensitive drum 5. The spot has an intensity distribution along the main scanning direction x (which is parallel to the $\xi$ axis on the diaphragm 6) as indicated by the following formulas (7) through (9):

$$I(x) = I_0 \left( \frac{\sin(A_1 x)}{A_1 x} \right)^2 \cos^2(B_1 x) \quad (7)$$

$$A_1 = \frac{\pi(a - a')}{\lambda f_2} \quad (8)$$

$$B_1 = \frac{\pi(a + a')}{\lambda f_2} \quad (9)$$

wherein x is the coordinates on the photosensitive drum 5 in the main scanning direction;

$I_0$ is the spot center intensity;

$\lambda$ is the wavelength of the semiconductor laser; and $f_2$ is the focal length of the condenser lens 4.

As can be understood by these formulas, if $\beta$ is the ratio between the total width $2a$ of the aperture and the width $2a'$ of the cover portion 111 (i.e., $\beta = a'/a$), then the diameter of the spot on the surface of the photosensitive drum 5 decreases when the value of $\beta$ increases.

Figure 7:
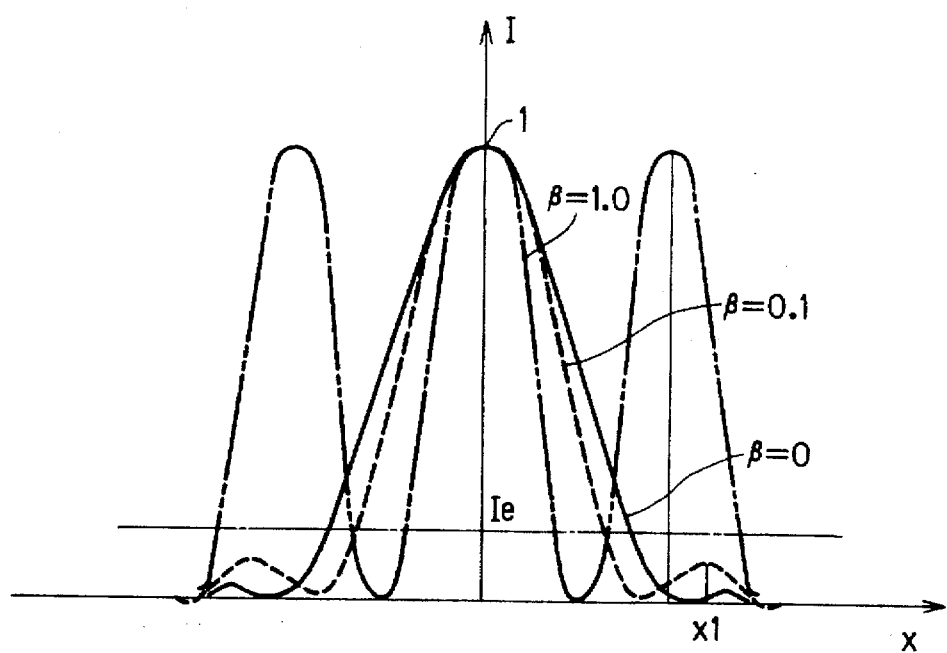
FIG. 7 is a graphical representation comparing intensity distribution of spots produced by the conventional optical scanning device shown in FIG. 1 and the optical scanning device shown in FIG. 5 and as irradiated on a photosensitive drum.

FIG. 7 shows the intensity distribution of spots irradiated on the surface of the photosensitive drum 5. Three spots are represented in the graph, each having a different $\beta$ value. The intensity distributions are determined using the above formulas. In the graph, spot center intensity $I_0$ of each spot is normalized to 1. Also, the diameter intensity $I_e$ of each spot is defined by 13.5% of the spot center intensity $I_0$ and shown in the graph by the horizontal line drawn across the graph at 0.135 of the vertical axis I. Therefore, the diameter of a particular spot is represented in the graph by the distance between two points where the intensity distribution curve of that particular spot intersects the intensity $I_e$ line. The curve $\beta=0$ represents intensity distribution produced with a conventional coverless diaphragm where no cover is provided and therefore where $a'=0$. The diameter of the spot becomes smaller the nearer the value $\beta$ comes to 1. That is, the more the cover portion 111 covers the aperture 101, the smaller the size of the spot formed on the surface of the photosensitive drum 5. However, the intensity of side lobes also increases the more the aperture is covered, which could adversely affect resolution to a degree that depends on the sensitivity of the photosensitive drum 5. The center position $x_1$ of side lobes can be determined by the following formula (10):

$$x_1 = \frac{\lambda f_2}{(a+a')} \quad (10)$$

The side lobe center intensity $I_1$, that is, the intensity at the center position $x_1$ of side lobes, can be determined by the following formulas (11) and (12):

$$I_1 = I_0 \left( \frac{\sin C_1}{C_1} \right)^2 \quad (11)$$

$$C_1 = \frac{\pi(a-a')}{(a+a')} \quad (12)$$

At the extreme value of $\beta=1$, the side lobe center intensity $I_1$ nearly equals the spot center intensity $I_0$, so that in the graph the plotted curves representing intensity of the side lobes are aligned at either side of the curve representing the intensity at the spot center. The minimum intensity at which the photosensitive drum 5 can be exposed without an image forming on the photosensitive drum 5 (referred to as the minimum exposure intensity hereinafter) depends on the sensitivity of the photosensitive drum 5. The optimum value for $\beta$ is within a range at which the side lobe center intensity $I_1$ will be lower than the minimum exposure intensity. However, from a practical standpoint, the side lobe center intensity $I_1$ is often kept below half of the spot center intensity $I_0$ (i.e., $I_1 < I_0/2$). Therefore an appropriate value for $\beta$ is 0.39 or less.

The aperture in the diaphragm need not be a rectangular shape, but can be a circular or ellipsoidal shape. The shape of the aperture can be optionally determined according to the desired spot shape. The shape of the cover portion need not only have a width in the main scanning direction, but can also have a width in the auxiliary scanning direction or in both the main and auxiliary scanning directions.

Figure 8:
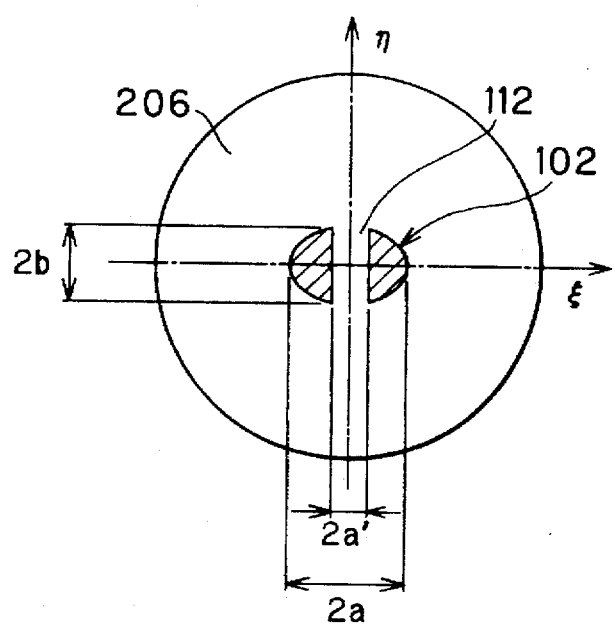
FIG. 8 is a planer view showing a diaphragm according to a second preferred embodiment of the present invention.

For example, FIG. 8 shows a diaphragm 206 according to a second preferred embodiment of the present invention. In the center of the diaphragm 206 is an ellipsoidal aperture 102 with a length in the $\xi$ axial direction of $2a$ and a length in the $\eta$ axial direction of $2b$. In the center of the aperture 102 is a cover portion 112 with a width in the $\xi$ axial direction of $2a'$. When the cover portion 112 is not present, light beams that pass through the diaphragm 206 are focused by the condenser lens 4 onto the surface of the photosensitive drum 5 into a spot with an intensity distribution indicated by the following formulas (13) through (15):

$$I = I_0 \left( \frac{2J_1(R)}{R} \right)^2 \quad (13)$$

$$R^2 = A^2 x^2 + B^2 y^2 \quad (14)$$

$$A = \frac{2\pi a}{\lambda f_2}, B = \frac{2\pi b}{\lambda f_2} \quad (15)$$

wherein x represents coordinates on the surface of the photosensitive drum 5 in the main scanning direction; and y represents coordinates in the auxiliary direction.

When the cover portion 112 covers the aperture 102 only in the main scanning direction in the same manner as explained in the first preferred embodiment, the intensity distribution in the x direction becomes similar to that obtained in the first preferred embodiment. That is, where $\beta$ is defined to a value of $a'/a$, the nearer the value of $\beta$ is to 1, the smaller the diameter of the spot becomes.

Figure 9:
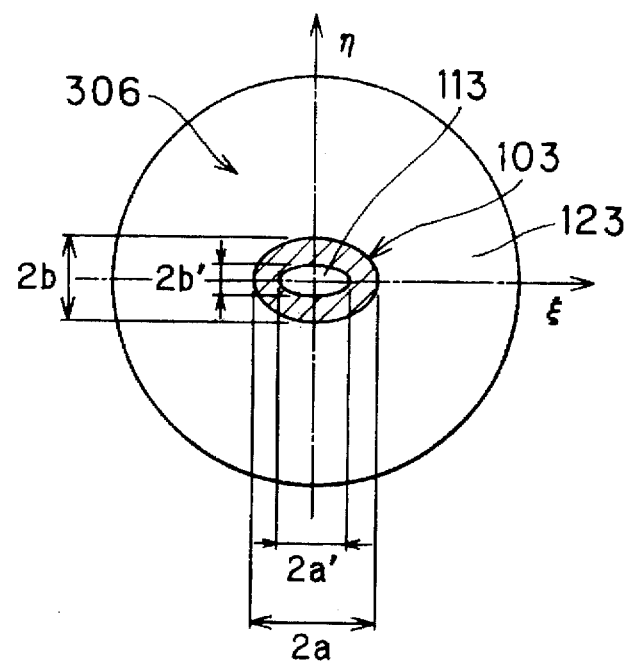
FIG. 9 is a planer view showing a diaphragm according to a third preferred embodiment of the present invention.

FIG. 9 shows a diaphragm 306 according to a third preferred embodiment of the present invention. In the center of the diaphragm 306 is an ellipsoidal aperture 103 shaped the same as the ellipsoidal aperture 102 in the second preferred embodiment. In the center of the ellipsoidal aperture 103 is an ellipsoidal cover portion 113 with a width $2a'$ in the $\xi$ axial direction and a width $2b'$ in the $\eta$ axial direction. To form this structure, a toroidal mask with outer diameter determined by the size desired for the aperture and with inner diameter determined by the size desired for the cover portion 113 is placed on a transparent base, such as glass. An opaque substance, such as carbon, is applied to the transparent base to form the cover portion 113 and an outer light-blocking area 123 which defines an outer periphery of the aperture 103. With this structure, the shape of the spot on the surface of the photosensitive drum 5 can be two-dimensionally controlled, which increases freedom of design.

According to the present invention, the rate of efficiency $\gamma$ is determined dependent on the value $\beta$. The relationship between $\gamma$ and $\beta$ will be described below for the case employed with the diaphragm 106 of FIG. 6, for example.

It is noted that the rate of efficiency $\gamma$ equals a product of: a value $\gamma_1$ dependent on a shape and a size of the aperture on the diaphragm; and a value $\gamma_2$ dependent on optical elements employed in the device. Assume that a total amount of light beam incident on the diaphragm 106 is normalized to 1 and that the incident light beam has intensity distributed in Gaussian distribution to have a beam radius (at the intensity of $1/e^2$) of $W_\xi$ in the $\xi$ axial direction and $W_\eta$ in the $\eta$ axial direction. In this case, the amount of light $P_{\xi\eta}$ that passes through the aperture 101 is expressed by the following formula:

$$P_{\xi\eta} = \frac{2\sqrt{2}}{W_\xi \sqrt{\pi}} \left\{ \int_0^a \exp\left(\frac{-2\xi^2}{W_\xi^2}\right) d\xi - \int_0^{a'} \exp\left(\frac{-2\xi^2}{W_\xi^2}\right) d\xi \right\} \times$$

$$\frac{2\sqrt{2}}{W_\eta \sqrt{\pi}} \int_a^b \exp\left(\frac{-2\eta^2}{W_\eta^2}\right) d\eta$$

Thus, the passing light amount $P_{\xi\eta}$ is determined dependently on the sizes a and a'. Because the total amount of the incident light is normalized to 1, $\gamma_1$ equals $P_{\xi\eta}$, and therefore the rate of efficiency $\gamma$ can be expressed by the following formula:

$$\gamma = P_{\xi\eta} \times \gamma_2$$

When the size a is determined, determining the value a' determines the value β. Accordingly, the above two formulas represent the relationship between the value β and the rate of efficiency γ. Thus, the value β determines the rate of efficiency γ.

Figure 3:
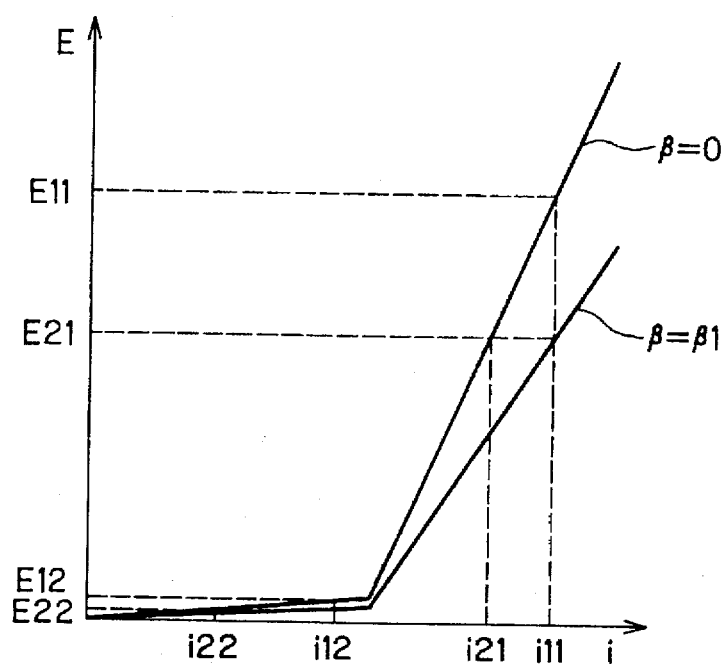
FIG. 3 is a graphical representation showing the relationship between the drive current i of the laser and the intensity E of light irradiated on the photosensitive drum.

The size of the cover portion is therefore determined by the rate of efficiency γ needed to attain the intensity modulation rate required by the sensitivity characteristic of the photosensitive drum 5. As described already with referring to FIG. 3, again assume that the light must be modulated to produce an illumination intensity $E_{21}$ at areas of the photosensitive drum 5 that are to be illuminated and a non-illumination intensity $E_{22}$ at areas of the photosensitive drum 5 that are not to be illuminated. As shown in FIG. 3, the plotted curve indicated as $\beta=\beta_1=a'/1$ ($\neq 0$) represents the characteristic of the present invention. Drive current values required to produce illumination intensity $E_{21}$ and non-illumination intensity $E_{22}$ under the circumstance of $\beta=\beta_1$ are illumination current value $i_{21}$ and non-illumination current value $i_{12}$ respectively. If a drive current $i_{11}$ produces an intensity $P_{11}$ when $\beta=0$, a value for β that reduces the rate of efficiency γ to a degree of $P_{21}/P_{11}$ is acceptable. For example, if the value $\beta_1$ reduces the rate of efficiency γ to a degree of $P_{21}/P_{11}$ as shown in FIG. 3, the curve represented by $\beta=\beta_1$ can be obtained. When β thus equals $\beta_1$, a drive current $i_{12}$ will produce an intensity $P_{22}$ which attains the non-illumination intensity $E_{22}$. Naturally, the current modulation width can be decreased by using drive current values i modulated mainly within the sharply inclined range of the plotted line in the graph. In other words, the following relationship (16) is established:

$$i_{11} - i_{12} < i_{21} - i_{22} \qquad (16)$$

Accordingly, circuit configuration can be simplified. It is preferable that the light drive current value $i_{11}$ generally has a value of 60% of the value at which the semiconductor laser is rated. However, the life of the laser and the stability of oscillation of the laser must be taken into consideration.

Figure 4:
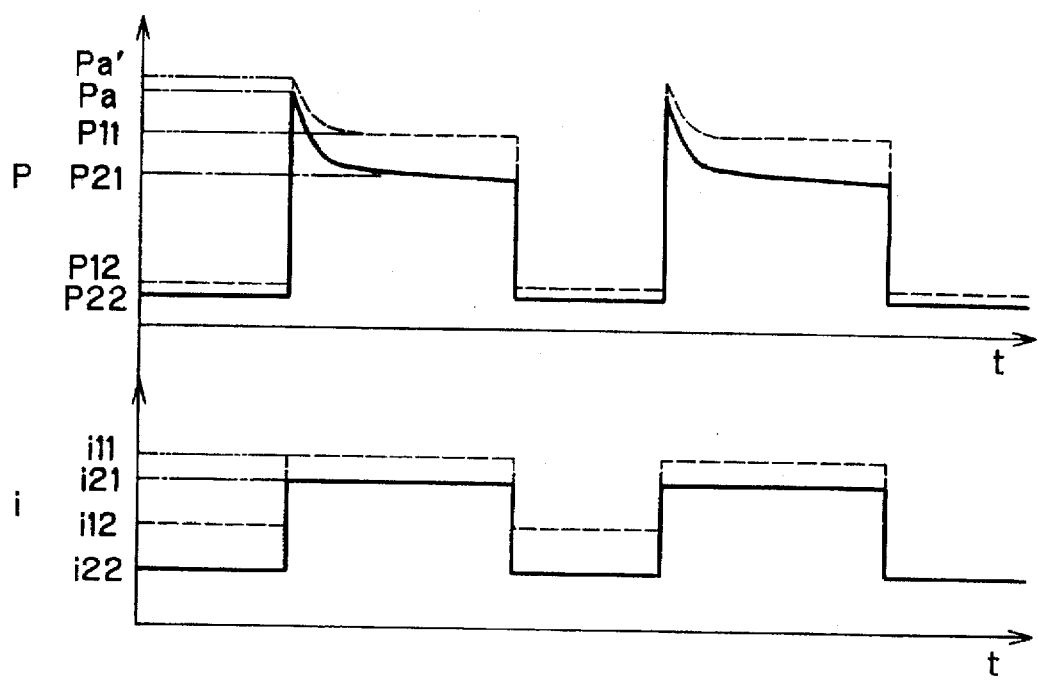
FIG. 4 is a graphical representation showing the correspondence over time t between intensity P of light irradiated on the photosensitive drum by a semiconductor laser of the optical scanning device shown in FIG. 1 and a drive current i for driving the semiconductor laser.

According to the present invention, the semiconductor laser 1 is thus applied with a greater current $i_{11}$ which is much higher than the threshold value. Accordingly, the semiconductor laser 1 is driven to emit a greater intensity $P_{11}$, and therefore the droop characteristic can be improved. This will be explained while referring to FIG. 4. As depicted by dotted lines, when the drive current i is modulated between the drive current $i_{12}$ and drive current $i_{11}$ of the present invention, intensity P increases first from $P_{12}$ to $P_a'$ and approaches the $P_{11}$. The difference between $P_a'$ and $P_{11}$ is not as great as the difference between $P_a$ and $P_{21}$ and intensity of light produced by the semiconductor laser is stabler.

While the invention has been described in detail with reference to specific embodiments thereof, it would be apparent to those skilled in the art that various changes and modifications may be made therein without departing from the spirit of the invention, the scope of which is defined by the attached claims.

For example, in the first and second embodiments, each of the apertures 101 and 102 is made from a through-hole formed in the diaphragm. However, the aperture may be made similarly as in the third embodiment. That is, the diaphragm may be made from a transparent base. The base is partly covered with an opaque substance, with an uncovered part being shaped as the aperture 101 or 102 to serve as the aperture.

Figure 10:
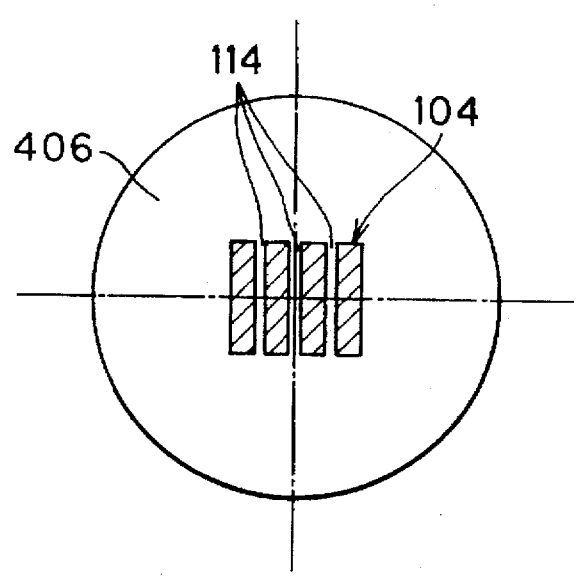
FIG. 10 is a planer view showing an example of a diaphragm according to the present invention with a plurality of cover portions.

The cover portion for obtaining the above-described rate of efficiency need not be a single cover portion, but can instead be formed from a plurality of covers 114 aligned in the aperture. An example of this type of cover portion is shown in FIG. 10.

The same results as described above in the preferred embodiment can be obtained when the present invention is applied to a scanning optical system which includes an optical system for correcting irregularities at which reflective surfaces of the polygon mirror are angled relative to each other. In such a scanning optical system, a cylindrical lens is provided between the collimator lens and the deflection device so as to collimate only in the auxiliary direction. A condensing lens is also provided that is capable of deflecting in the auxiliary scanning direction.

The light source can be any light source which emits light with directivity. According to such a light source as emits light with directivity, intensity of light emission varies dependently on directions in which the light emits from the light source. For example, a gas laser, a solid laser which uses a semiconductor laser as the source of the pumping light, or an LED can be used as the light source for the optical scanning device according to the present invention.

Figure 11:
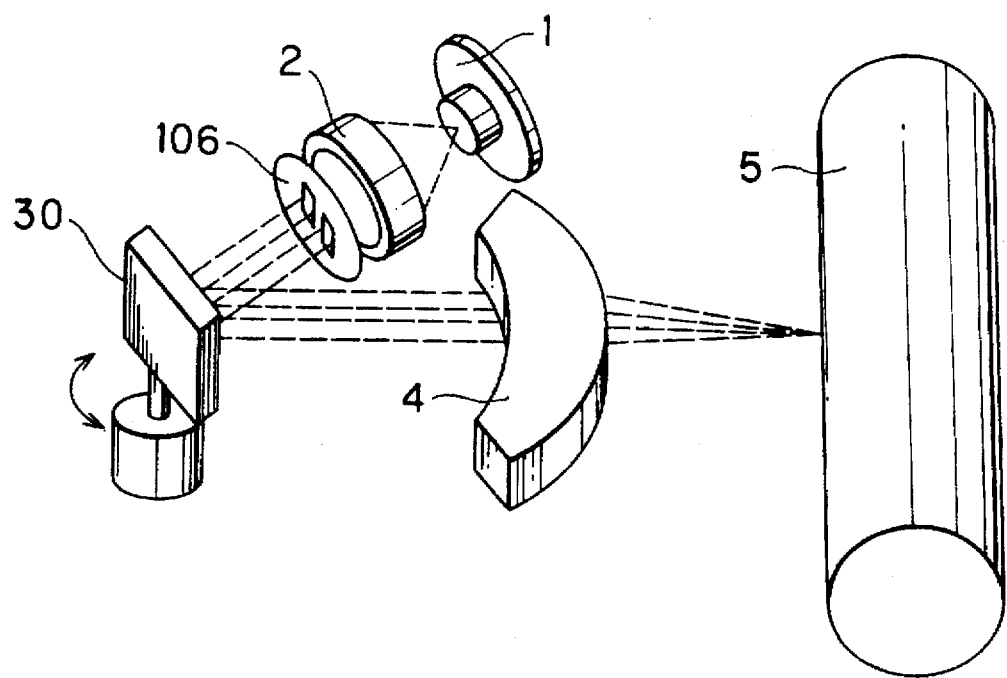
FIG. 11 is a perspective view showing an optical scanning device according to the present invention wherein a galvanomirror is used as the deflection device.
Figure 12:
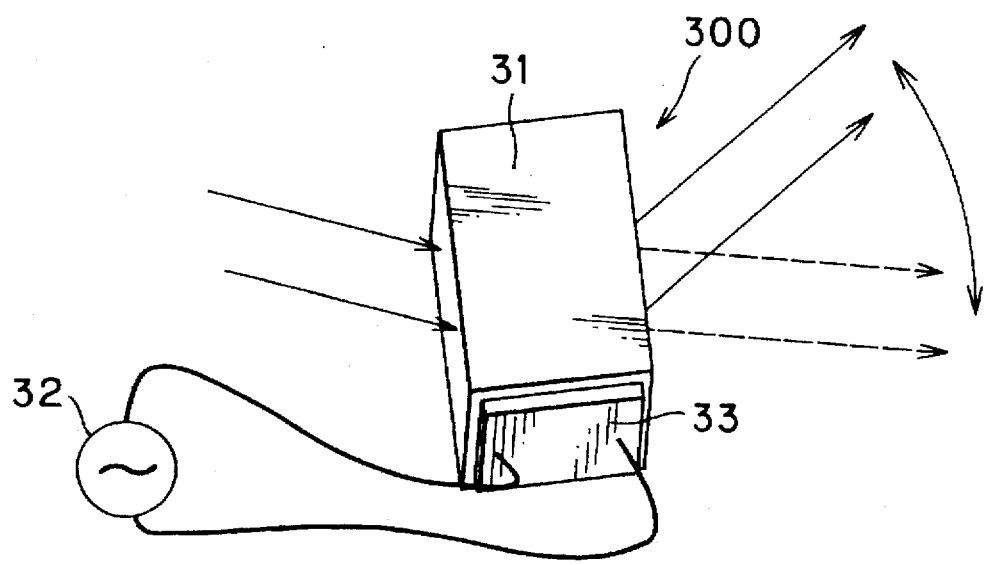
FIG. 12 is a perspective view of an acoustooptic deflector which can be used as the deflection device in an optical scanning device according to the present invention.

The deflection device can be a galvano-mirror or deflection-mirror 30, such as that shown in FIG. 11, wherein the reflective surface is swept back and forth at a predetermined frequency. The reflective surface could also be rotated depending on the structure of the optical scanning device. The deflection device can also be an acoustooptic deflector 300, such as that shown in FIG. 12. In the acoustooptic deflector 300, a serrated modulation signal is inputted from a signal source 32 to a transducer 33 to propagate ultrasonic waves in a transparent material 31. The cyclic structure of the refraction rate is used as a diffraction lattice in the transparent material. Bragg diffraction is induced in light incident on the transparent material so that the incident light is scanned in the deflection direction.

As described above, according to the present invention, a light beam from a light source is changed by a diaphragm so that the center of the light beam is removed. The changed light beam is then deflectedly scanned by a deflection device and passed through a condenser lens so as to expose the surface of a photosensitive object. A small spot of light beam of stable intensity is obtained to be irradiated on the photosensitive object. Thus, the present invention allows producing an inexpensive optical scanning device with a simple structure and high resolution.

What is claimed is:

1. An optical scanning device for scanning light beams onto a photosensitive body, the device comprising:

a light source for selectively emitting light beams of a predetermined first intensity and of a predetermined second intensity lower than the first intensity and the light source is operated for emitting light beams in a desired operating condition so as to selectively emit light beams of the predetermined first and second intensities, the light source including a semiconductor laser capable of emitting a laser beam when applied with a drive current, the laser having a driving characteristic in which an intensity of the laser beam increases at a first rate as a value of the drive current increases in a first current range higher than a predetermined threshold value and the intensity of the laser beam increases at a second rate as the value of the drive current increases in a second current range lower than the predetermined threshold value, the first rate being higher than the second rate, the semiconductor laser emitting the first intensity upon being applied with a drive current of a first current value and emitting a laser beam of the second intensity upon being applied with a drive current of a second current value, the first current value being higher than the second current value and a range between the first and second current values being substantially located within the first current range;

a deflection device for deflecting the light beams emitted from the light source in a scan;

a photosensitive body positioned so that the light beams deflected by the deflection device becomes incident on a surface of the photosensitive body, the photosensitive body having a predetermined photosensitivity to form an image on the surface of the photosensitive body upon being exposed to a light beam of predetermined first exposure amount and without forming an image on the surface of the photosensitive body upon being exposed to a light beam of a predetermined second exposure amount;

a condensing means for gathering light from the light source and directing the light toward the surface of the photosensitive body; and a diaphragm positioned between the light source and the deflection device for receiving the light beam having the first and second intensities from the light source, a center portion of the diaphragm being formed with an aperture, the diaphragm including a cover portion blocking a center portion of light emitted from the light source from passing through the aperture, a size of the cover portion relative to a size of the aperture resulting in the light beam having the predetermined first and second exposure amounts being directed to the photosensitive body, wherein the size of the cover portion relative to the size of the aperture is selected dependent on both the photosensitivity of the photosensitive body and the first and the second current values, whereby the light beam having the predetermined first and second exposure amounts is directed to the photosensitive body.

2. An optical scanning device as claimed in claim 1 wherein the light source emits light beams having directivity.

3. An optical scanning device as claimed in claim 1 wherein the light source is a gas laser.

4. An optical scanning device as claimed in claim 1 wherein the light source is a solid laser.

5. An optical scanning device as claimed in claim 1 wherein the light source is a light emitting diode.

6. An optical scanning device as claimed in claim 1 wherein the deflection device is a polygon mirror including a plurality of reflective surfaces that are rotated at a set cycle.

7. An optical scanning device as claimed in claim 1 wherein the deflection device is a mirror with a reflective surface that is swung back and forth at a set cycle.

8. An optical scanning device as claimed in claim 1 wherein the deflection device is an acoustooptic optical element for propagating progressive waves in a transparent object.

9. An optical scanning device as claimed in claim 1 wherein the diaphragm further includes a plurality of cover portions aligned across the aperture so as to partially cover the aperture.

10. An optical scanning device as claimed in claim 9 wherein the aperture is a formed in a rectangular shape.

11. An optical scanning device as claimed in claim 9 wherein the aperture is formed in an ellipsoidal shape.

12. An optical scanning device as claimed in claim 1 wherein the diaphragm is formed from a transparent substrate selectively covered with an opaque substance to form the cover portion and an outer light-blocking area defining an outer periphery of the aperture.

* * * * *